United States Patent [19]

Alvarez Calderon F

[11] Patent Number: 5,118,052
[45] Date of Patent: Jun. 2, 1992

[54] VARIABLE GEOMETRY RPV

[76] Inventor: Albert Alvarez Calderon F, 410 Fern Glen, La Jolla, Calif. 92037

[21] Appl. No.: 115,333

[22] Filed: Nov. 2, 1987

[51] Int. Cl.⁵ .......................... B64C 1/30; B64C 3/56
[52] U.S. Cl. .................................... 244/49; 89/1.801; 244/120; 244/218
[58] Field of Search ..................... 244/49, 2, 120, 124, 244/3.26-3.3, 218; 89/1.801, 1.81, 1.816-1.818

[56] References Cited

U.S. PATENT DOCUMENTS

| | | | |
|---|---|---|---|
| 2,673,047 | 3/1954 | Scarato | 244/49 |
| 3,139,248 | 6/1964 | Alvarez-Calderon | 244/218 |
| 3,703,998 | 11/1972 | Girard | 244/120 |
| 4,240,601 | 12/1980 | Reed | 244/49 |
| 4,471,923 | 9/1984 | Hoppner et al. | 244/49 |
| 4,667,899 | 5/1987 | Wedertz | 244/49 |

FOREIGN PATENT DOCUMENTS 969489 12/1950 France .................................. 244/49
WO86/04836 8/1986 PCT Int'l Appl. .

OTHER PUBLICATIONS

Chambon et al, "Convertible-Airplane" Aug. 1986.

Primary Examiner—Galen L. Barefoot

[57] ABSTRACT

A Variable Geometry Remotely Piloted Vehicle (VG-RPV) has a main fuselage portion supporting at one end main wing panels and a forward fuselage portion. In the stowed position, the main wings and forward fuselage portion are laterally adjacent the main fuselage. This provides compact volume of small dimensions for stowage inside a canister. When deployed for flight, the wings are inclined at a large angle to the main fuselage, and a fuselage forebody is positioned upstream of the main fuselage, to establish a vehicle center of gravity adjacent to the deployed wings. Folding panels are mounted on chordwise hinges at the tip of the main wing panels. These panels overlap the main wing panels in the stowed configuration, inside the canister or on deck, and extend the span and area of the deployed main panels in the flight configuration. In-flight deployment is provided to launch the VG-RPV with a reduced span and area with the folding panels placed under the main panels. After launch, but prior to slow speed flight, aerodynamic in-flight deployment of the folding panels is aided with trailing tabs on the folding panels.

7 Claims, 4 Drawing Sheets

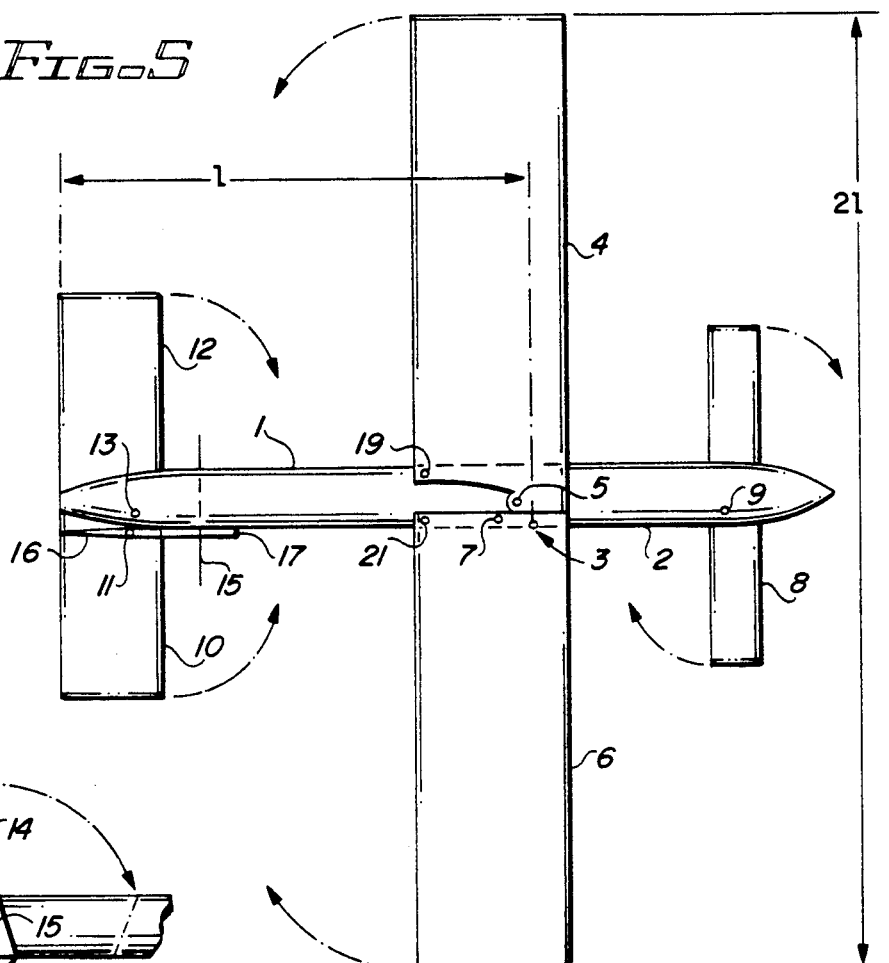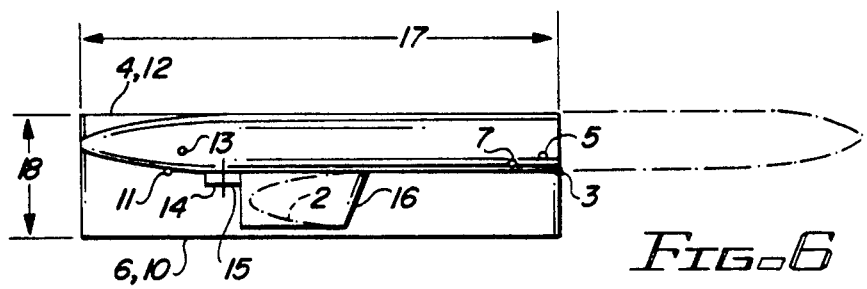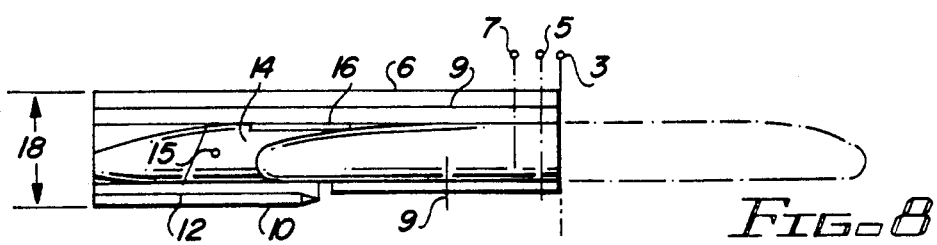

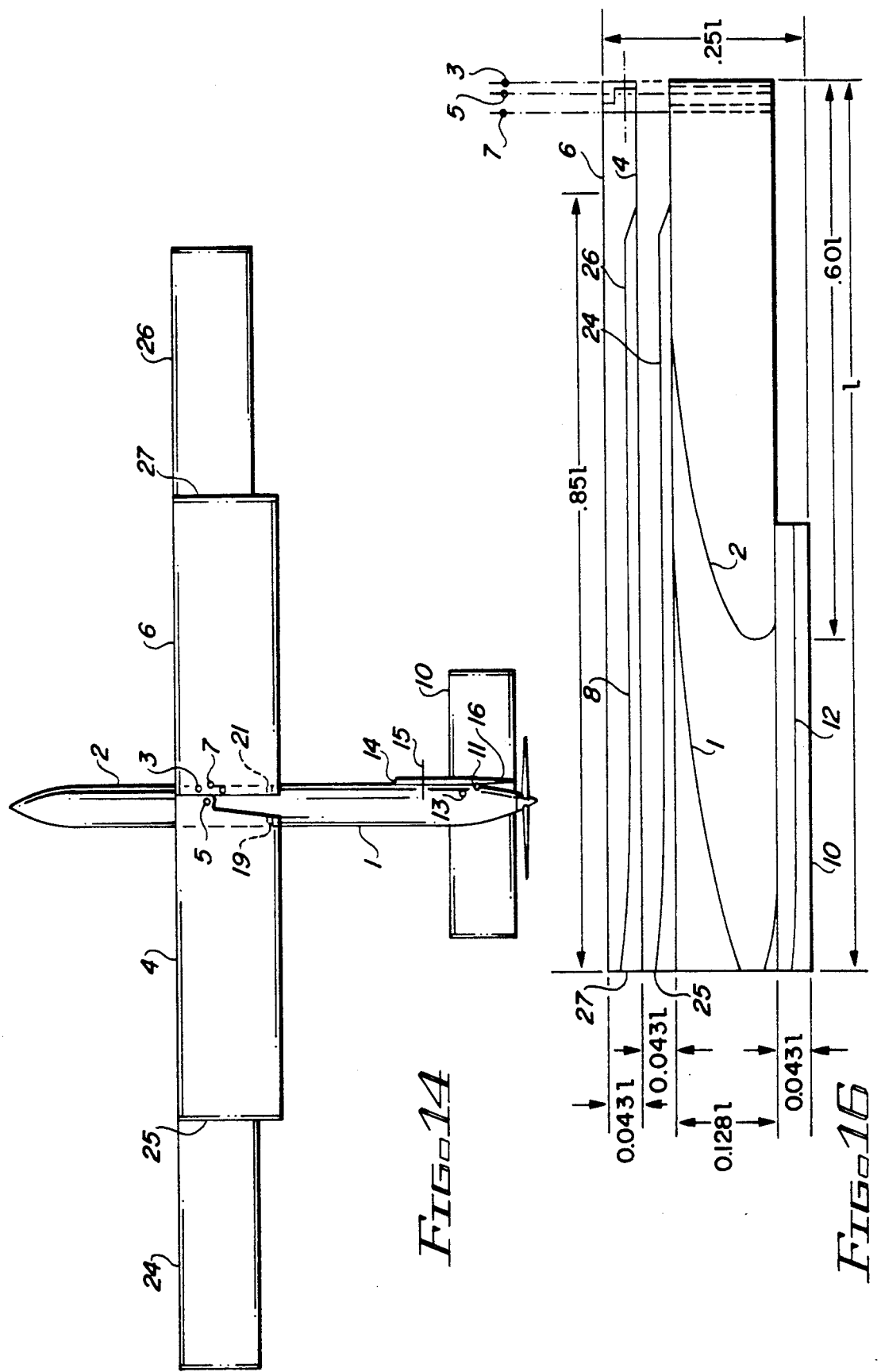

VARIABLE GEOMETRY RPV

FIELD OF INVENTION

The present invention pertains to stowable remotely piloted vehicles (RPV) and to aircraft which use variable geometry fuselage and wings.

BACKGROUND

RPV's must be stowed before use. Small stowed dimension compared to flight dimensions, and compact stowed volume, are highly desirable for transportation and for storage aboard vehicles such as trucks, tanks, submarines, aircraft, and warships. Carrier based full-size aircraft share similar stowing problems on the flight deck and on elevators of fixed dimensions. Small aircraft which have to be transported inside large aircraft and other vessels have the same problem.

RPV's are conveniently stored in long canisters. Wing panels are pivoted at one end of a fuselage of a length equal to the canister's length. This results in a wing panel span approximately equal to the length of the canister. Such arrangements work well with tandem wings and canard RPV configurations. The reason why these unusual configurations are compatible with long canisters is related to center of gravity requirements and span benefits which are explained later on with the aid of FIGS. 1-4. It is evident from that review that there is a need for a new solution for stowable RPV's of conventional monoplane configuration which fit in a long canister, or a long stowing space, and have no penalties in span size and center of gravity locations. This is accomplished by my invention described in FIGS. 5-16.

BRIEF DESCRIPTION OF THE INVENTION

The efficient utilization of a canister or other stowing space of length 1 for a stowable conventional monoplane RPV of a span approximately equal to 2 1 is accomplished with a variable geometry (VG) fuselage which establishes, when deployed, the proper center of gravity for the VG-RPV. The fuselage comprises main or rearbody of length 1 which at its forward end supports a a long forebody or nose which carries payload. The forebody folds back about 180° for stowage in the canister length 1. The wings are pivoted on the main fuselage body adjacent to its forward end so that each wing panel can have a length close to 1. This gives the RPV minimum overall span of about 21. When the forebody is deployed forward, its weight and/or the payload weight it houses brings the CG of the deployed RPV contiguous to the wing's position. Hence, the tail moment arm from the CG to the rear horizontal and vertical surfaces becomes close to the canister's length 1. This arrangement provides good longitudinal and directional stability. It also increases the length of the deployed fuselage to a value substantially larger than 1, adds to the fuselage's volume for more payload and improves the fuselage's finesse ratio to decrease drag.

The wings comprise a main wing panel pivoted on the main body adjacent its forward end. The main wing panels support at their outboard chordwise edges chordwise hinges, on which are mounted folding wing panels which when deployed extend the span of the main panels. When the main panels are in the stowed position, there is an overlapped relation between the main and folding panels.

BRIEF DESCRIPTION OF DRAWINGS

FIGS. 1 shows a canister or stowing space of length 1 in which there can be stowed a tandem wing RPV with a fuselage of length 1 and wing panels of span 1. The RPV deploys to the position shown in FIGS. 2-3. It has a flight center of gravity at approximately the fuselage's midbody, which is compatible with the fuselage's volume and with the area ratio of the front and rear wings of the RPV, as will be explained later on.

FIG. 4, considered with a reversed flight direction shows that the configuration is incompatible with a conventional tractor (or pusher) monoplane, because its center of gravity position, to the rear of the main wing, would make it unstable in pitch.

FIG. 5 shows one preferred embodiment of my invention in plan view with conventional wings deployed in the flight configuration, and with the new variable geometry fuselage also deployed. FIG. 6 shows the retracted stowed configuration in plan view. FIG. 7 shows in side elevation the retractable vertical tail. FIG. 8 shows in side elevation the retracted stowed configuration of the VG-RPV.

FIG. 14 shows folding wing panels added to the VG-RPV of FIG. 5. FIG. 16 shows its stowed configuration.

DETAILED DESCRIPTION OF THE INVENTION

Figure 1:
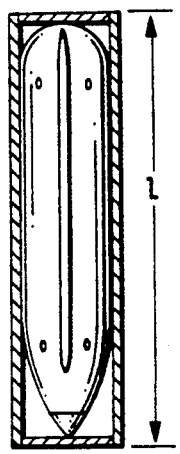
Figure 2:
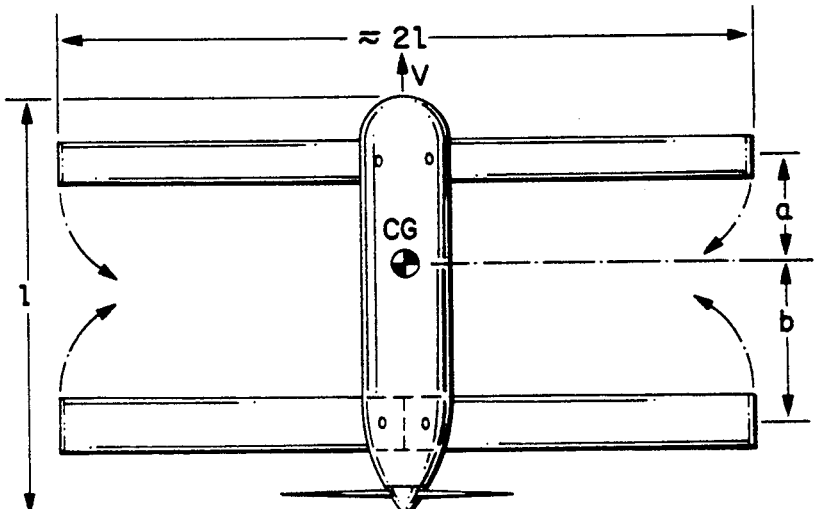
Figure 3:
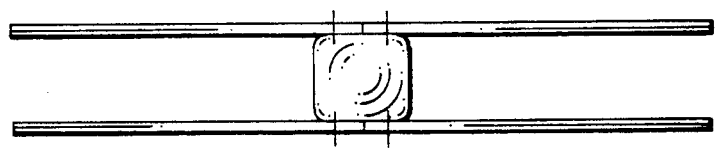

FIG. 1 shows a canister of length 1 inside of which there is a tandem wing pusher RPV having a fuselage length 1, and four wing panels each with a span substantially equal to 1. It deploys as shown in FIG. 2, with an overall span of about 21 and an approximate mid-body center of gravity CG at distance a from the front wing and b from the rear wing. The front view is shown in FIG. 3. The areas of front and rear wing in FIG. 2 can be selected so that with the distance ratio a to b, they provide inherent longitudinal stability in the pusher flight mode (flight direction V), with a good utilization of the volume of the fuselage for fuel and other payload. Thus, the CG position of the vehicle is near the fuselage's middle, which is compatible with the area ratio of its wings. Also, a maximum span approximately equal to 21 and a maximum fuselage 1 length are secured relative to canister length 1. A compact storage arrangement is evident.

Figure 4:
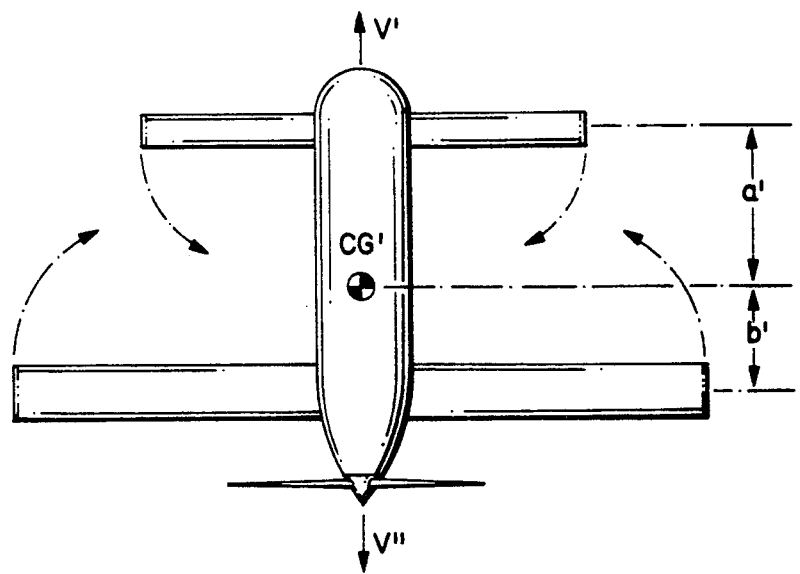
FIG. 4 shows how a canard RPV configuration can have a center of gravity between the front tail and rear wings, compatible with the canister's length and the wing's area ratio, providing good pitch stability.

FIG. 4 shows that with a more rearward location of the center of gravity CG', for example due to a heavy pusher engine, the area and span of the front wing are reduced to a canard configuration, to permit good longitudinal stability when flying in the direction V'.

If the designer wished to use a standard tractor monoplane RPV configuration with a conventional tail, it would still look like in FIG. 4, but its flight direction would be reversed to V''. In that situation, however, the center of gravity CG' would be completely off the acceptable range, since for inherent pitch stability, the conventional monoplane's CG'' (not shown) should be under the wing. The RPV of FIG. 4 as a conventional monoplane would be unstable in pitch flying in the V" direction, but would be stable in the canard V' direction.

The previous review points out that the canister storage arrangement of FIG. 1 which optimizes well for tandem and canard RPV's, because of CG problems does not work well for conventional monoplanes. Conventional monoplanes with rear pusher engines would be even more difficult. RPV's for surveillance purposes should have pusher engines. This difficult problem is solved by my invention of a variable geometry fuselage, described below.

FIG. 5 shows in planform main fuselage 1 having a length 1 equal to the length of a canister or stowing space. A folding forebody or nose fuselage portion 2 is hinged on 1 at articulation 3, shown as a pivot. When deployed, it brings the center of gravity of the VG-RPV to a position under the wing, necessary for stability. Deployed main left wing panel 4 is hinged on top of 1 at vertical articulation 5, shown as a pivot axis. Deployed right main panel 6 is hinged at its vertical pivot 7. The overall span is 2 l. A deployed horizontal tail has right panel 10 pivoted at 11 under fuselage 1, and a left panel 12 pivoted at 13 under fuselage 1. Tails 12-10 provide longitudinal stability and control, with a tail moment arm approximately equal to 1. A vertical tail 14 is shown pivoted at horizontal hinge 15. An optional front surface 8 pivoted under nose 2 at hinge 9 can be used for added longitudinal trim.

FIG. 6 shows in planform the RPV of FIG. 4 with its wings and fuselage forebody folded back by 180° to a stowed configuration, to fit inside the canister. Therefore, the length of main wing panels 4 and 6 and main fuselage 1 is substantially the same as the canister length l, identified as 17. The chords of the main wings and horizontal tail have the same width as that of the combined main and forebody fuselage, which is substantially the same as the canister's width 18.

FIG. 7 shows in side view of folding fin 14 hinged at its pivot 15. Rudder 16 is mounted on the fin. An auxiliary low fin can fold for storage about a fore-and-aft axis, below main fuselage 1.

FIG. 8 shows the side elevation of the stowed configuration corresponding to FIG. 6.

Figure 9:
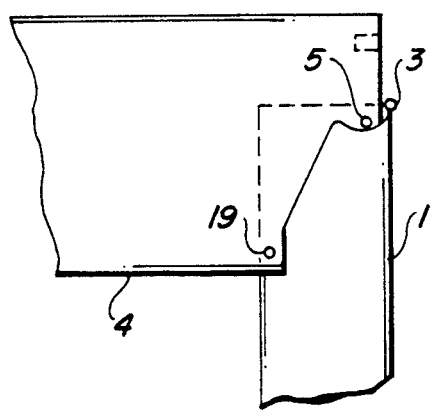
FIGS. 9 to 13 show the hinge locations for mounting the pivots of the main wings on the main fuselage body.
Figure 10:
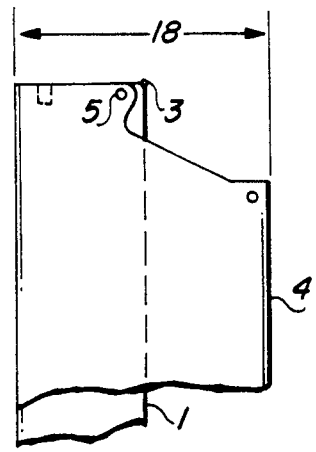

FIGS. 9 and 10 show details of the main left wing 4 deployed and retracted on pivot or articulation 5, respectively, relative to fuselage 1.

Figure 11:
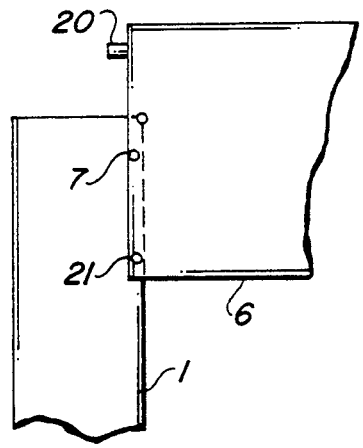
Figure 12:
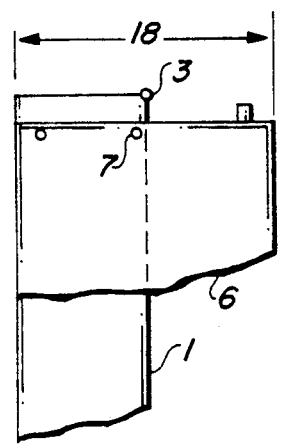

FIGS. 11 and 12 show details of the main right wing 6 deployed and retracted on pivot 7, respectively, relative to fuselage 1.

Figure 13:
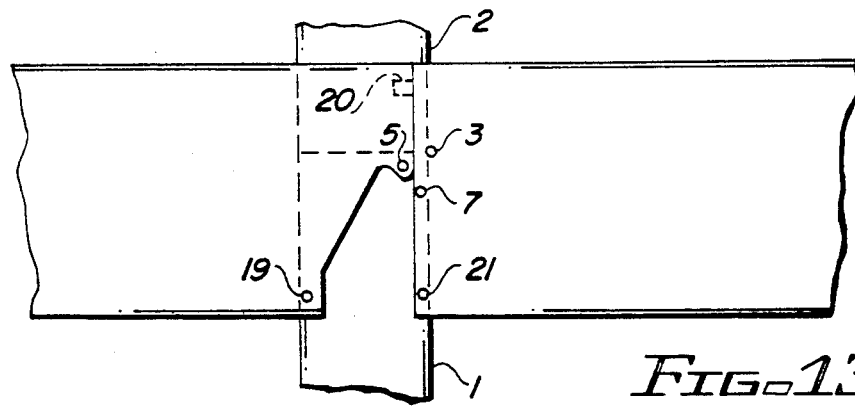

FIG. 13 shows main left and right wings 4 and 6 deployed relative to fuselage 1. Bending and shear is carried at main pivots 5 and 7 near the wing's main spars, with torsion-drag load pick-up points near the wing's trailing edge spars at positions 19 and 21. A nose alignment pin 20 between 4 and 6 alto take drag loads. It can be engaged to top of deployed fuselage forebody 2 to take torsion as well.

To retract the wings for the stowed configuration, firstly, main wing panel 6 is rotated backwards (clockwise) 90° on a threaded articulation 7. This raises panel 6 above the top surface of main fuselage 1, leaving a shallow space between them. The left main panel 4 is then rotated backwards (counter-clockwise) about hinge 5, to fit in the shallow space between main fuselage 1 and main wing 6. FIG. 8 shows in side view the resulting stowable arrangement in side elevation. Horizontal tails have been folded forward 90°, and front surface has been rotated 90°. Also, rudder 16 has been deflected 90° on its hinge.

My invention as described in FIGS. 5 to 13 has solved the CG problems for a conventional monoplane RPV configuration which fits into a canister or stowing space of length 1, has a wing span 2 l, a long tail moment arm approximately equal to 1, and a variable geometry fuselage which deploys to a length substantially greater than the l. This brings the CG of the deployed VG-RPV contiguous to or under the wing. The stowed configuration is suitable for small canister dimensions and volume. The deployed configuration has a wing span, which remains limited by the 2 l dimensions, and is not optimum for slow speed flight, because its area and span are not large. To solve this remaining problem. I utilize a further variable geometry feature of my invention, this time on the main wing panels, as is described in FIGS. 14 to 16.

FIG. 14 shows in planform the RPV of FIG. 5 with its main wing panel 4 and 6 modified to incorporate variable geometry folding panels 24 and 28, respectively. The folding panels are hinged at chordwise axes 25 on main wing 4, and 27 on main wing 6. The main wing panels have trailing edge flaps 23, and the folding panels have trailing tabs 22 which can be used to aid in flight deployment, as will be reviewed later on.

FIG. 14 also shows that the distance 29 between a center of gravity of the VG-RPV 28 estimated at midchord of the wing, and the midchord of the tail, is approximately equal to the canister's length l.

The Movement of the folding wing panels can be downwards or upwards, depending on mode of utilization of these panels for the RPV. In either case, the overall span with the folded panel deployed becomes approximately 4 l, which is substantially twice that of FIG. 5. In upward folding-unfolding, the hinged wing panel is placed on top of the main wing panel supporting it, prior to stowing the RPV in its canister. To deploy the RPV's wings prior to launch, the hinged panels are unfolded about 180° upward and outward, for example, with a spring, to a locked span-increasing position. The main advantage of the upward pre-flight deployment is that there is no clearance required between the RPV's fuselage and the ground or deck of the vehicle supporting the RPV.

Storage and pre-flight deployment with the hinged panels under the main panels is also possible, but downward outward deployment requires elevating the RPV's fuselage above the ground level or deck by a distance approximately equal to the span of the folding panel, which is impractical in many cases.

Figure 15:
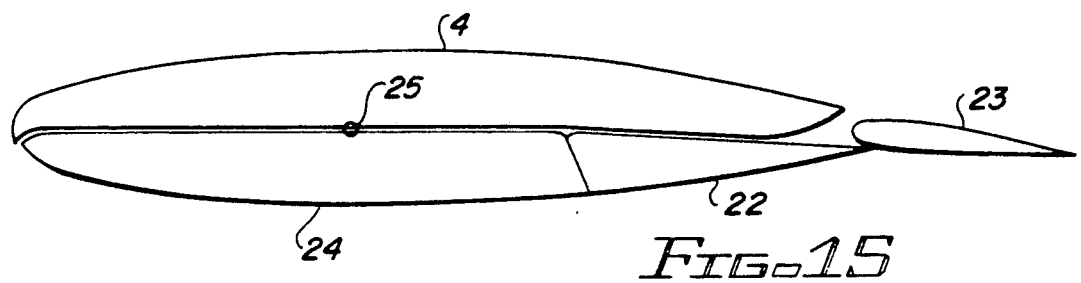
FIG. 15 shows the corresponding wing sections to permit launch with the panels folded and to provide in-flight retraction and deployment compatibility.

However, RPV's which have a launch and cruise-out mission leg at high speed, and then must fly an endurance or maximum range leg at low speeds, can have large benefits of performance using variable geometry folding wings which vary the span and area in flight downward and outward, for example, by increasing these dimensions at the end of the cruise-out leg, prior to the endurance/range legs. For this type of in-flight span variation, the position of the hinged panels during launch and cruise-out is shown in FIG. 15, relative to the main panels. For clarity, FIG. 15 identifies main left panel 4, its folding retracted panel 24, and its hinge axis 25. Also shown is tab 22 which aids the in-flight aerodynamic transition of panel 24 downwards and outward by 180°. By launching the VG-RPV with its hinged panels retracted as in FIG. 15, the space requirements near the launch track is halved, and the wing load is approximately doubled, which is beneficial for cruise out. Also, the launch can be at ground or deck level, since no clearance is needed for pre-flight deployment of the hinged panels.

The stowed arrangement of my VG-RPV with variable geometry fuselage and variable geometry wings with folding panels is shown in FIG. 16 for a canister length l, a canister depth of 0.25l, and a canister width of 0.25l. The deployed dimensions in the flight configuration are specified below in terms of the canister's length l.

| Configuration | Launch/Cruise | Max. Range/Endurance |
|---|---|---|
| Figure | 5 | 14 |
| Span | 2.00 l (retracted) | 3.70 l (deployed) |
| Chord | .25 l | .22 l (average) |
| Area | .50 $l^2$ | .81 $l^2$ |
| Fuselage length | 1.60 l (deployed) | 1.60 l (deployed) |
| Tail moment arm | l (approx.) | l (approx.) |

In modified embodiment of the invention, the main panels can be flown (with the folding panels retracted) as swing wings in which high sweep is used for high mach number; intermediate sweep is used for intermediate mach number. No sweep with deployed folding panels are used at low mach numbers.

These and other variations and embodiments of my invention can be made without departing from its spirit. For example, the compactness of the general arrangement of FIG. 16, with the vary large span increment of FIG. 14, provide special advantages for carrier-based full-size aircraft which have to be stowed in small dimensions. In this application, variable sweep wings in flight can be provided by wing panels 4 and 6 at 45° sweepback, with folding panels 24 and 26 retracted under panels 4 and 6 for supersonic flight. The wings are then fully deployed to configuration of FIG. 16 for flight at low indicated air speed. The same variable sweep variable span benefits can be applied for flying bombs or flying torpedoes, which have to be housed inside elongated containing spaces on aircraft and submarines.

What I claim is:

1. A stowable variable geometry unmanned vehicle system comprising an elongated stowing space having a long dimension, and an unmanned variable geometry vehicle having a stowed configuration within said stowing space, and a flight configuration of overall dimension substantially larger than said stowing space; with said unmanned variable geometry vehicle being characterized in having a first fuselage portion with a first end, a second fuselage portion mounted on said first portion at a hinged articulation adjacent said first end, with said first and second fuselage portions in said stowed configuration being placed in a folded position approximately parallel and generally contiguous to each other within and approximately parallel to said long dimension of said stowing space, and with said first and second fuselage portions in said flight configuration being placed deployed in a streamlined relation one ahead of the other, with their combined overall long dimension being longer than the long dimension of said stowing space; said unmanned variable geometry vehicle being further characterized in having right and left main wing panels mounted on articulations on a fuselage portion, said main wing panels being placed in said stowed configuration approximately parallel to and within said long dimension of said stowing space, and said main wing panels being placed in said flight configuration inclined at a large angle to said combined overall long dimension of said fuselage portions; with the combined weights of said first and second fuselage portions and the payload of said vehicle contributing to establish a vehicle center of gravity in said flight configuration in the proximity of said main wing panels.

2. Claim 1, further characterized in that each of said main wing panels has a chordwise wing tip which supports a folding wing panel at a chordwise hinge adjacent said chordwise wing tip, in that said folding wing panels are located relative to said main wing panels in an overlapped relation in said stowed configuration, and in that said folding panels are located outboard of said main wing panels in said flight configuration.

3. The structure of claim 1 further characterized in that said folding panels are located under the main wing panels in said stowed configuration substantially parallel to said fuselage portions, in that said folding panels remain located under the main wing panels in a launch configuration with said main panels inclined to said fuselage portions in a flight configuration, and in that said folding panels after launch are unfolded in flight for a slow-speed flight configuration which increases the span and area of said main wing panels.

4. The structure of claim 3 further characterized in that said folding panels are equipped with trailing edge tabs which aid in the in-flight transition of said folding panels between their two flight configurations.

5. The structure of claim 1 further characterized in that a horizontal auxiliary airfoil surface is mounted adjacent an end of a fuselage portion opposite to said hinged articulation, in that said auxiliary surface is placed approximately parallel to a fuselage portion in the stowed configuration and inclined at a large angle to said fuselage portion in said flight configuration, and in that the distance between said auxiliary surface and said main wings in said flight configuration is approximately equal to the length of said fuselage portion supporting said auxiliary surface.

6. The structure of claim 5 further characterized in that the distance between said auxiliary surface and the center of gravity of said vehicle in its flight configuration is a large distance approximately equal to the length of the fuselage portion supporting said auxiliary surface.

7. The structure of claim 1 is further characterized in that a horizontal auxiliary airfoil surface is mounted adjacent the end of each of said fuselage portions at a location opposite to said hinged articulation, in that said auxiliary surfaces are placed approximately parallel to the fuselage portions in said stowed configuration and inclined at a large angle to said fuselage portions in said flight configuration, and in that the distance between said auxiliary surfaces and said main wings in said flight configuration is approximately equal to the length of the fuselage portion which supports said auxiliary surfaces.

* * * * *